United States Patent Office 3,708,429
Patented Jan. 2, 1973

3,708,429
CLEANING COMPOSITIONS
Philip George Hall, Poulton, England, assignor to Lever Brothers Company, New York, N.Y.
No Drawing. Filed Feb. 25, 1971, Ser. No. 119,057
Claims priority, application Great Britain, Mar. 6, 1970, 10,870/70
Int. Cl. C11d 7/06
U.S. Cl. 252—156                    9 Claims

ABSTRACT OF THE DISCLOSURE

A substantially anhydrous cleaning composition incorporates a surface active agent, an alkaline catalyst and an acid release agent in a lower aliphatic alcohol. The undiluted composition is strongly alkaline and is effective for removing fatty soils from pans and the like, but when the composition is added to water the acid release agent tends to lower the alkalinity to an acceptable level for dishwashing purposes.

---

The present invention concerns cleaning compositions, particularly compositions adapted for dishwashing and the like.

According to the invention a cleaning composition comprises a substantially anhydrous mixture of:

(a) a surface active agent,
(b) an alkaline catalyst,
(c) an acid release agent, and
(d) a lower aliphatic alcohol.

Compositions of this type are adapted for dual-purpose use, combining the functions of alkaline cleaning compositions used undiluted for cleaning fatty soil from pots, pans, ovens and the like, and of dishwashing compositions used diluted in water. This is accomplished by making the undiluted composition highly alkaline to facilitate chemical reaction with fatty soils, whilst, on dilution of the composition in water, the acid release agent is caused to decrease the pH of the resultant solution to an acceptable pH for manual dishwashing purposes, usually pH 7 to pH 9.5.

Additionally, whether or not the dual purpose utility is particularly desired, the presence of an acid release agent in the compositions tends to improve their safety in use. Specifically, when a composition has been applied to a soiled surface and is then removed by wiping with a wet cloth or rinsing under water, the presence of an acid release agent will then tend to lower the pH of the resultant solution so that its potentially harmful effect on the skin is decreased.

The alcohol used is preferably methanol or ethanol, both for reasons of efficiency and economy. This ingredient makes up the balance of the composition and is normally present in an amount of from about 40 to about 90%, particularly about 50 to about 70% by weight. It is believed that the alcohols function by cleaving the ester linkages in polymerised fats in the presence of alkaline catalysts. The preferred catalysts are alkali metal methoxides and ethoxides, particularly the sodium compounds. However, other alkaline materials such as alkali metal hydroxides, especially sodium and potassium hydroxides, or substituted ammonium hydroxides such as tetra methyl ammonium hydroxide, may be used provided the other ingredients in the composition are stable in the presence of the hydroxides. The amount of the alkaline catalysts is normally from about 1 to about 5% by weight.

The acid release agent is a material which is stable in the anhydrous composition but when the composition is diluted in water the material tends to lower the pH of the composition. Preferably the acid release agent is an acid salt, for example sodium dihydrogen phosphate or potassium hydrogen tartrate, which is not attacked by the alkaline catalyst in the substantially non-aqueous composition.

If desired, the acid release agent can be encapsulated using an encapsulating material which is, again, stable in the anhydrous composition but which dissolves or otherwise disperses in water so that the acidic material becomes effective when the composition is diluted. Specific encapsulating materials include, for example, water-soluble materials including polymers of synthetic or natural origin, such as gelatin or starch, and thermoplastic materials such as wax. The acid release agents suitable for encapsulating include organic acids such as citric acid, glutaric acid and tartaric acid, acid salts such as sodium dihydrogen phosphate, potassium hydrogen tartrate, sodium bisulphate, and liquid acidic materials, especially when adsorbed onto solid carrier materials, for example acetic acid adsorbed onto bentonite. The acid release agent should become effective by rupture of the encapsulating material either by its dissolution in water or by melting in warm water, but it may also be desirable to use an encapsulating material which is pressure-rupturable so that the acid release agent becomes effective more quickly when the composition is rubbed on a surface, and the composition is thereby safer to use. The encapsulation of the acid release agent may be accomplished readily by conventional techniques, for example by spraying the encapsulating material onto an agitated bed of the acid release agent.

The amount of the acid release agent is normally from about 4 to about 25% by weight in the composition. The amount should be such in relation to the alkalinity of the composition and the acidity of the acid release agent that the aqueous solution of the composition for dishwashing is acceptable for manual contact.

The surface active agent should be alkali-stable and chosen to give effective detergency and lathering properties in use. Many suitable surface active agents are commercially available and are preferably anionic or nonionic surface active agents, for example alkyl benzene sulphonates such as sodium dodecyl benzene sulphonate, alkyl and alkyl ether sulphates such as sodium dodecyl sulphate and sodium lauryl ether (3EO) sulphate, and alkyl and alkyl phenol alkylene oxide condensation products such as octyl phenol-6EO (EO is used as an abbreviation for ethylene oxide units). Some amphoteric surface active agents may be used, for example hydroxy alkyl methyl taurines such as sodium hydroxyalkyl ($C_{14}$–$C_{15}$) methyl taurine. Other suitable alkali stable surface active agents are described in the literature, for example in "Surface Active Agents and Detergents," vols. I and II, by Schwartz, Perry and Berch.

The compositions may additionally incorporate lather boosters, for example higher alkyl ethanolamides such as the ethanolamides of lauric acid or coconut fatty acids or alkyl ($C_{10}$–$C_{14}$) amine oxides. The amounts of the surface active agents, including any lather boosters are generally from about 5 to about 40% by weight.

The compositions preferably contain thickening or suspending agents to improve their storage properties, and particularly to avoid the acid release agent separating out from the compositions on standing, which would necessitate shaking the compositions prior to use. A further benefit of the presence of a thickening or suspending agent, particularly one which makes the composition thixotropic or of gel form, is to improve the cleaning properties of the composition by making it adhere longer to any vertical surfaces which are treated. Specific thickening or suspending agents are silicas and clays in finely divided form, for example from about 10 to 100 m$\mu$, which may be treated so as to make them more hydrophobic and so more effective, as for example in the case of the so-called silanised silicas. The amount of any thickening or suspending agent is preferably within the range of from about 1 to about 20% by weight.

The compositions may incorporate trace amounts of water without losing their substantially anhydrous nature, but the amount of any water present is preferably not more than about 0.1% by weight. If desired, the compositions may contain minor amounts, say up to about 5% by weight, of desiccants, such as anhydrous sodium sulphate, to decrease the effect on the acid release agent of any water either present in the composition or inadvertently added thereto during use.

The compositions may incorporate optional additives including, particularly, organic solvents to improve their fatty soil removal properties. Specific organic solvents which are effective are, for example, trichlorethylene, anisole and acetophenone. The amount of any organic solvent is usually up to about 20% by weight.

The compositions may also incorporate minor amounts of ingredients to inhibit any tendency to alkoxide polymerisation. Suitable ingredients for this purpose are so-called free radical chain stoppers such as alkyl phenols, for example p-tert-butyl phenol and tri-tert-butyl phenol, hydroquinone and aromatic amines which may be present up to about 1% by weight.

Due to the presence of a high proportion of lower aliphatic alcohol, the compositions tend to have low flash points, but this disadvantage can be decreased if desired by their incorporating minor amounts of high boiling solvents miscible with the alcohols, for example propylene glycol and higher glycols. The amount of any flash point elevating solvent is generally up to about 10% by weight.

The compositions may be prepared by simple admixture of the ingredients in a suitable vessel. Preferably the mixing is accomplished in a colloid mill or other high-shear mixer so as to produce a smoother, more stable product.

The compositions are particularly adapted for use by spray-dispensing to avoid manual contact with the undiluted product. The composition is sprayed onto the pans or other articles to be treated and left for a period after which the pans are immersed in water and washed in the usual way.

The invention is illustrated by the following examples in which parts and percentages are by weight.

All of the compositions in the Example are made by admixture of the ingredients in a stirred vessel at ambient temperatures.

EXAMPLE 1

| Ingredient: | Percent |
| --- | --- |
| Ethanol | 63 |
| Sodium methoxide | 4 |
| Sodium dihydrogen phosphate (anhydrous) | 10 |
| Sodium dodecyl benzene sulphonate | 11 |
| Sodium lauryl ether (3EO) sulphate | 7 |
| Coconut ethanol amide | 1 |
| Silica EP93 (silanised silica) | 4 |

EXAMPLE 2

| Ingredient: | Percent |
| --- | --- |
| Ethanol | 52 |
| Sodium methoxide | 4 |
| Sodium dihydrogen phosphate (anhydrous) | 10 |
| Sodium hydroxy alkyl ($C_{14-15}$) methyl taurine | 15 |
| Sodium dodecyl sulphate | 15 |
| Silica EP93 | 4 |

EXAMPLE 3

| Ingredient: | Percent |
| --- | --- |
| Ethanol | 57.5 |
| Sodium methoxide | 5 |
| Sodium dihydrogen phosphate (anhydrous) | 12.5 |
| Octyl phenol 6EO | 7.5 |
| Sodium dodecyl sulphate | 12.5 |
| Bentone 27 (cationic substituted clay) | 5 |

EXAMPLE 4

| Ingredient: | Percent |
| --- | --- |
| Ethanol | 57.5 |
| Sodium methoxide | 5 |
| Sodium dihydrogen phosphate (anhydrous) | 12.5 |
| Octyl phenol 6EO | 5 |
| Sodium dodecyl sulphate | 10 |
| Silica EP93 | 5 |
| Acetophenone | 5 |

EXAMPLE 5

| Ingredient: | Percent |
| --- | --- |
| Eethanol | 65 |
| Sodium methoxide | 1 |
| Silica EP93 | 4 |
| Sodium dodecyl sulphate | 20 |
| Sodium dihydrogen phosphate (anhydrous | 10 |

EXAMPLE 6

| Ingredient: | Percent |
| --- | --- |
| Ethanol | 63 |
| Sodium methoxide | 1 |
| Silica EP93 | 4 |
| Sodium dodecyl sulphate | 20 |
| Sodium dihydrogen phosphate (anhydrous) | 10 |
| Sodium sulphate (anhydrous) | 2 |

EXAMPLE 7

| Ingredient: | Percent |
| --- | --- |
| Ethanol | 65 |
| Sodium hydroxide | 1 |
| Sodium dodecyl sulphate | 20 |
| Silica EP93 | 4 |
| Wax-coated citric acid | 10 |

Each of the compositions in the examples exhibit good fatty soil removal properties when used undiluted and good dishwashing properties when used in aqueous solution in the conventional manner.

What is claimed is:
1. A substantially anhydrous cleaning composition consisting essentially of:
  (a) from about 5 to 40% by weight of an alkali stable surface active agent selected from the group consisting of anionic, nonionic and amphoteric surface active agents,
  (b) from about 1 to about 5% by weight of an alkaline catalyst selected from the group consisting of sodium and potassium methoxides, sodium and potassium hydroxides and tetra methyl ammonium hydroxide,
  (c) from about 4 to about 25% by weight of an acid release agent selected from the group consisting of sodium dihydrogen phosphate, potassium hydrogen tartrate, and acidic materials which are encapsulated with an encapsulating material which dissolves or otherwise disperses in water so that the acidic material becomes effective when the composition is diluted, said acid material being selected from the group consisting of citric acid, glutaric acid, tartaric acid, sodium bisulphate and acetic acid adsorbed onto bentonite, and
  (d) from about 40% to about 90% by weight of a lower monohydric alcohol selected from the group consisting of methanol and ethanol.
2. A composition according to claim 1 additionally incorporating up to about 5% by weight of anhydrous sodium sulphate as a dessicant.
3. A composition according to claim 1 additionally incorporating up to about 20% by weight of an organic solvent selected from the group consisting of trichloroethylene, anisole and acetophenone.

4. A composition according to claim 1 additionally incorporating up to about 1% by weight of an alkoxide polymerisation inhibitor selected from the group consisting of p-tert-butyl phenol, tri-tert-butyl phenol and hydroquinone.

5. A composition according to claim 1 additionally incorporating up to about 10% by weight of propylene glycol as a flash point elevating solvent.

6. A composition according to claim 1 additionally incorporating a lather booster selected from the group consisting of lauric ethanolamide, coconut ethanamide and alkyl ($C_{10}$–$C_{14}$) amine oxides.

7. A composition according to claim 1 additionally incorporating from about 1 to about 20% by weight of a compound selected from the group of thickening and suspending agents consisting of finely divided silicas and clays.

8. A composition according to claim 1 comprising from about 50 to 70% by weight of the lower monohydric alcohol.

9. A composition according to claim 8, wherein the alkaline catalyst is selected from the group consisting of sodium and potassium methoxides and sodium and potassium hydroxides, and the acid release agent is selected from the group consisting of sodium dihydrogen phosphate and potassium hydrogen tartrate.

References Cited

UNITED STATES PATENTS

| 3,031,408 | 4/1962 | Perlman et al. | 252—158 |
| 3,031,409 | 4/1962 | Perlman et al. | 252—158 |

MAYER WEINBLATT, Primary Examiner

U.S. Cl. X.R.

252—158, 159, 160, 193